United States Patent [19]

Hirschvogel et al.

[11] 4,091,083

[45] May 23, 1978

[54] METHOD FOR THE PRODUCTION OF GRAPHITE-HYDROGENSULFATE

[75] Inventors: Alfred Hirschvogel, Langweid; Friedrich Wagner, Gersthofen, both of Germany

[73] Assignee: Sigri Elektrographit GmbH, Meitingen near Augsburg, Germany

[21] Appl. No.: 767,775

[22] Filed: Feb. 11, 1977

[30] Foreign Application Priority Data

Mar. 4, 1976 Germany ............................. 2608866

[51] Int. Cl.$^2$ ...................... C01B 31/00; C01B 31/04
[52] U.S. Cl. ................. 423/415 R; 423/448; 423/460
[58] Field of Search .................. 423/415 R, 445, 448, 423/460

[56] References Cited

U.S. PATENT DOCUMENTS

| 1,191,383 | 7/1916 | Aylsworth | 423/460 X |
| 3,389,964 | 6/1968 | Olstowski | 423/448 |
| 3,414,381 | 12/1968 | Olstowski et al. | 423/448 |
| 3,885,007 | 5/1975 | Olsen | 423/460 |

FOREIGN PATENT DOCUMENTS 991,581   5/1965   United Kingdom ................. 423/448

*Primary Examiner*—Edward J. Meros
*Attorney, Agent, or Firm*—Herbert L. Lerner

[57] ABSTRACT

Production of graphite-hydrogensulfate by dispersing crystalline graphite particles in sulfuric acid, agitating the mixture, adding hydrogen peroxide to the agitated dispersion and continuing agitation until the graphite is converted to graphite-hydrogensulfate. Excess acid is separated and the residual acid in the solid product is removed by washing. The graphite-hydrogensulfate may be heated to transform it into expanded graphite. The method minimizes pollution of the atmosphere with noxious gases and also makes possible ready recovery of unused acid.

5 Claims, No Drawings

METHOD FOR THE PRODUCTION OF GRAPHITE-HYDROGENSULFATE

BACKGROUND OF THE INVENTION

1. Field of the Invention

This invention relates to graphite-hydrogensulfate and, more particularly, refers to a new and improved process for the treatment of graphite to produce graphite-hydrogensulfate.

2. Description of the Prior Art

It was known in the production of expanded graphite, to wet flaky graphite particles with an oxidizing acid or another oxidation agent or to treat them in an acid or mixture of acids, and to dissociate the graphite salt which is formed in the reaction by rapid heating. During the heating, the volume of the graphite particles increases considerably, for example, more than hundred times, because of the gas that is suddenly generated. In graphite of a high degree of structural order or crystallinity, the particles spread apart, similar to the pages of an opening book, in a direction perpendicular to the laminar planes of the graphite crystals, in such a manner that the coherence within the particles is never completely lost. The bloated particles which are known under the name of expanded graphite show a characteristic harmonica-like or worm-like structure, and are easily pressed to form shaped parts, whereby the particles, due to their unusual structure, lock in with each other, like teeth, so that the use of an additional binding agent is not required. Expanded graphite in the form of odd particles and the shaped parts produced from the latter are an excellent material for seals of all kinds, among other reasons because of their plasticity, unusual for graphite.

For the production of graphite salt which is the preferred starting material for the making of expanded graphite, numerous compounds or compound mixtures are known as oxidation agents, such as fuming nitric acid, solutions of nitric acid, solutions of perchlorate or chromate in sulfuric acid, potassium-permanganate, lead dioxide and others. The graphite particles are wetted with the oxidation agents or dispersed in them, and the formed graphite salts are washed for the removal of acids and oxidation agents when the reaction is completed. Since it is not possible even by the most thorough washing, to remove the oxidation agents completely from the graphite salt, the remainder of these agents unfavorably influences the corrosion behavior of the expanded graphite product made from the salt. Oxidation agents which contain metal-ions cannot be used because of their corrosive activity. Other oxidation agents, such as fuming nitric acid or ammonium persulfate can only be safely handled with considerable difficulty, and further require an unduly long time for treatment because of their slow reaction speed. The commonly used agent presently used is a mixture consisting of concentrated sulfuric acid and fuming nitric acid, in a ratio of 10:1 to 2:1. This mixture can be comparatively safely handled and thoroughly oxidizes the graphite in the reaction, producing a reaction product designated graphite-hydrogensulfate. Unfortunately, this mixture has the decided disadvantage of forming nitrogen oxides, particularly nitrogen dioxide, during the reaction with the graphite. Part of these nitrogen oxides escape directly into the atmosphere, and part of the nitrogen oxides is dissolved in the sulfuric acid and then escapes as nitrous vitriol gas during the separating-purification operations which are required for the separation of the formed graphite salt.

The continuous generation of nitrogen oxides, from the first contact of the acid mixture to the final treatment of the graphite salt makes costly preventive measures for the protection of the environment mandatory, and even such measures do not completely avoid pollution of the environment. Also disadvantageous is the high water content of the acid mixture after the reaction because, in addition to the reaction-water which cannot be avoided, water is brought in with the nitric acid. If it is attempted to increase the concentration of the sulfuric acid by the addition of oleum, nitrous vitriol gases are developed in large amounts in sudden bursts. These gases can only be partly extracted with considerable effort by filter installations and washing. Other methods for concentration of acid remaining after treatment of graphite, are complicated by the fact that, after the reaction, the acid mixture contains graphite or graphite oxides in colloidal form. The expenditure in technique, time and money to raise the concentration is so great, particularly in smaller installations for the manufacture of expanded graphite, that as a rule, reclaiming of the acid is not attempted and the acid is neutralized and then drained to the sewage system.

SUMMARY OF THE INVENTION

An object of the present invention is to provide a method for the production of graphite-hydrogensulfate in which the used agents are readily reclaimed. Another object of the invention is to provide a method for the production of graphite-hydrogen-sulfate in which pollution of the environment by released gaseous or liquid pollutants is avoided or appreciably reduced.

With the foregoing and other objects in view, there is provided, in accordance with the invention, a method for the manufacture of graphite-hydrogensulfate which includes dispersing ground particles of crystalline graphite having at most a small amount of fine particles of less than 0.075 mm, in sulfuric acid, agitating the mixture of graphite particles and sulfuric acid to maintain the particles in a dispersed state in the sulfuric acid, thereafter adding hydrogen peroxide to the agitated dispersion and continuing the agitation until the graphite is converted to graphite-hydrogensulfate, separating the liquid containing acid from the solid converted graphite in the dispersion, and washing the solid to remove residual acid in the solid.

In the preferred method, in accordance with the invention, the hydrogen peroxide reactant is 80 – 90% $H_2O_2$; the hydrogen peroxide and sulfuric acid are in the proportion 2–5 parts by weight hydrogen peroxide to 100 parts by weight sulfuric acid; and 150–200 parts by weight of the hydrogen peroxide and sulfuric acid are reacted with 100 parts by weight graphite.

Spent acid in accordance with the invention, may be concentrated by the addition of oleum and recycled for further reaction with graphite.

DETAILED DESCRIPTION OF THE INVENTION

The method according to the invention is particularly advantageous when hydrogen peroxide of 80 to 90% is used. A concentration below 80% introduces more water into the reaction mixture and therefore not as desirable. The reaction-mixture should preferably contain for 100 parts by weight of sulfuric acid 2–5 parts by weight of hydrogen peroxide, and for 100 parts by weight of graphite, preferably 150–200 parts by weight of oxidation agent mixture, i.e. the sum of the hydrogen peroxide and sulfuric acid, is used.

In the production of graphite-hydrogensulfate, ground flaky graphite or other kinds of graphite of highly crystalline structure with a very small amount of fine constituents of less than 0.075 mm are mixed with concentrated sulfuric acid, preferably above about 96%, at room temperature and uniformly dispersed in the acid under intensive stirring.

The graphite particles used in the conventional process for making graphite-hydrogensulfate are suitable for use in the present invention. Ordinarily this is ground graphite of highly crystalline structure constituting a mixture of particles with a particle size ranging from 0.7 mm or higher to a size below 0.075 mm. The amount of particles below 0.075 mm is best kept low, preferably less than 5% and desirably less than 1% by weight of the mixture of ground particles. Mixtures having a mean particle size between about 0.1 and 0.3 mm have been found satisfactory. The portion of sulfuric acid is proportioned with respect to the amount of graphite so that the mass can be stirred during as well as after the reaction. A surplus of acid is desirably avoided. Amoung other factors, this portion of sulfuric acid will depend on the grain size of the graphite used, and the amount and degree of expansion. However, it was established that, independently of these parameters, good results were achieved with a ratio of 150–200 parts by weight of acid to 100 parts by weight of graphite.

It is important not to premix the hydrogen peroxide with the sulfuric acid prior to dispersing the graphite particles in the acid or to first wet the particles or add hydrogen peroxide to the particles before dispersing the particles in acid, as this tends to create localized zones of overreaction and underreaction and decomposition of the hydrogen peroxide producing an inferior graphite product and wasting hydrogen peroxide. Thus dispersion of the graphite particles in the sulfuric acid is first best accomplished in the absence of hydrogen peroxide.

After the complete dispersion of graphite particles in the acid, hydrogen peroxide is added with rapid stirring to insure dispersion of the particles and avoid localized spots of overreaction. Preferably 2–5 weight parts 80 to 90% peroxide are added to 100 weight parts of sulfuric acid. By the use of highly concentrated hydrogen peroxide, only a very small amount of water is introduced thus facilitating increasing the concentration level of the spent acid. The small amount of hydrogen peroxide makes it possible to practically avoid the formation of the disturbing colloids, despite the high-reaction speed. Agitation of the reaction mixture to obtain and maintain a dispersion, of which stirring is one suitable means, is continued for approximately 10 minutes without cooling forming a steadily thickening pulp or paste. Under these conditions, the graphite changes substantially completely to graphite-hydrogensulfate, with the formation of approximately 0.5 mol water for each mol of hydrogensulfate. The liquid containing excess acid in the reaction products is then separated, preferably by filtration, and the filter cake is washed several times with water and then dried. The graphite-hydrogensulfate made according to the method of the instant invention, is comparatively hygroscopic and absorbs, for example, when stored in air of a relative humidity of 40%, up to 13 weight % of water. Surprisingly, it was found that the expansion of the graphite particles was not hindered by the absorbed water, but an additional swelling of the particles was effected.

Graphite-hydrogensulfate masses can be used, for example, as cover for casting molds. This cover swells when heated and forms an effective thermal insolation. Preferably, graphite expandat is made from graphite-hydrogensulfate, whereby the graphite-hydrogensulfate particles are heated to a high temperature in a short time, for example, to 1000° C within 5 seconds. The spontaneous evaporation of the adsorption water and the dissociation and evaporation of the sulface, cause a sudden swelling or increase in the particle volume. The resulting expanded graphite called graphite expandat can be fabricated to flexible foils, sealing rings and similar articles, whose properties and behavior, just as the properties of the expandat-particles, are not different than that of a graphite expandat which has been manufactured by the nitric acid-sulfuric acid mixture.

The following comparative examples illustrate the present invention:

In the first formulation 70 kg flaked graphite of a grain size > 0.2 mm were stirred into 150 liters of 96% sulfuric acid and after dispersion of the graphite particles, 17 liters nitric acid (65%) were added. After 15 minutes, the excess acid was removed by filtration and the formed graphite-hydrogensulfate was dried, washed, and then expanded in a tube-furnace by heating to approximately 1200° C.

Nitrous vitriol gases were formed during the time between the addition of the nitric acid and the drying of the graphite-hydrogensulfate, so that the exhaust gases from the stirring tank and the filter had to be discharged through a washer without effecting a complete separation of the gases. A filtrate resulted of approximately 100 liters 90% sulfuric acid, containing approximately 10 kg $NO_2$ and a considerable amount of graphite or graphite oxide-colloid which made the filtration considerably more difficult. The amount of sulfuric acid contained in the wash water was approximately 40 liters. Wash water and filtrate were neutralized with lye and discharged into the drainage system.

In a second formulation 70 kg of the same graphite were treated in accordance to the method of the present invention. The graphite was stirred into 120 liter of 96% sulfuric acid to which then 3 liter 85% hydrogen peroxide were added. The reaction was completed after 10 minutes. Thereafter the excess acid was removed by filtration as described above and the residue in the filter was washed, dried and then expanded.

A filtrate of approximately 90 liter 93% sulfuric acid resulted which could be reclaimed to a higher concentration of 96% by the addition of oleum without the formation of noxious gases. The reclaimed acid was then recycled. The washing water contained only approximately 23 liters sulfuric acid. A special exhaust apparatus from the stirring tank and filter was not required and the damage by corrosion on these parts was considerably less than in the nitric acid-sulfuric acid procedure.

There are claimed:

1. Method for the manufacture of graphite-hydrogensulfate which comprises dispersing ground particles of crystalline graphite having at most a small amount of fine particles of less than 0.075 mm, in sulfuric acid, agitating the mixture of graphite particles and sulfuric acid to maintain the particles in a dispersed state in the sulfuric acid, admixing 2–5 parts by weight hydrogen peroxide to 100 parts by weight sulfuric acid by thereafter adding a 80–90% hydrogen peroxide to the agitated dispersion and continuing the agitation until the graphite is converted to graphite-hydrogensulfate, separating the liquid containing acid from the solid converted graphite in the dispersion, and washing the solid to remove residual acid in the solid.

2. Method according to claim 1 wherein 150–200 parts by weight of the hydrogen peroxide and sulfuric acid are reacted with 100 parts by weight of graphite.

3. Method according to claim 1 wherein said acid separated from the solid converted graphite is concentrated by the addition of oleum and recycled for further reaction with graphite.

4. Method according to claim 1 wherein the graphite-hydrogensulfate is heated to cause swelling and produces expanded graphite.

5. Method according to claim 2 wherein the graphite-hydrogensulfate is heated to cause swelling and produces expanded graphite.

* * * * *